United States Patent
Shani (10) Patent No.: US 9,710,189 B2
(45) Date of Patent: Jul. 18, 2017

(54) RESYNCHRONIZATION OF A REMOTE STORAGE SITE AFTER REPLICATION FAILURE

(71) Applicant: Infinidat LTD., Herzliya (IL)

(72) Inventor: Ayelet Shani, Moshav herev le'et (IL)

(73) Assignee: Infinidat Ltd., Herzliya (IL)

( * ) Notice: Subject to any disclaimer, the term of this patent is extended or adjusted under 35 U.S.C. 154(b) by 21 days.

(21) Appl. No.: 14/742,741

(22) Filed: Jun. 18, 2015

(65) Prior Publication Data
US 2016/0371007 A1    Dec. 22, 2016

(51) Int. Cl.
G06F 12/00       (2006.01)
G06F 3/06        (2006.01)
G06F 13/00       (2006.01)
G06F 13/28       (2006.01)

(52) U.S. Cl.
CPC .............. *G06F 3/065* (2013.01); *G06F 3/067* (2013.01); *G06F 3/0614* (2013.01)

(58) Field of Classification Search
CPC ......... G06F 3/065; G06F 3/0614; G06F 3/067
See application file for complete search history.

(56) References Cited

U.S. PATENT DOCUMENTS

| | | | | |
|---|---|---|---|---|
| 5,592,618 A * | 1/1997 | Micka | ................. | G06F 11/2074 711/162 |
| 6,199,074 B1 * | 3/2001 | Kern | ................... | G06F 11/2058 |
| 6,260,124 B1 * | 7/2001 | Crockett | ............. | G06F 11/2082 711/112 |
| 6,658,590 B1 * | 12/2003 | Sicola | ................. | G06F 11/1471 714/15 |
| 7,120,824 B2 * | 10/2006 | Burton | ................ | G06F 11/2058 707/999.01 |
| 7,152,183 B2 * | 12/2006 | Fujibayashi | ........ | G06F 11/2082 714/6.31 |
| 7,421,614 B2 * | 9/2008 | Watanabe | ........... | G06F 11/2058 711/162 |
| 7,546,482 B2 * | 6/2009 | Blumenau | ........... | G06F 11/1435 710/15 |

\* cited by examiner

*Primary Examiner* — Mark Giardino, Jr.
(74) *Attorney, Agent, or Firm* — Reches Patents (57) ABSTRACT

A method for replicating a local storage entity to provide a remote storage entity, the method may include receiving, by a local storage site, after an occurrence of a replication failure, after-failure remote storage site difference information indicative of differences between (i) a certain point in time version of the remote storage entity and (ii) an after-failure point in time version of the remote storage entity; calculating, by the local storage site, after the occurrence of the replication failure, after-failure local storage site difference information indicative of differences between (i) a certain point in time version of the local storage entity and (ii) an after-failure point in time version of the local storage entity; and sending, by the local storage site to the remote storage site, local storage entity portions listed in at least one of the after-failure remote storage site difference information and to the after-failure local storage site difference information, during an after-failure replication cycle; and wherein the certain point in time is associated with a last successful replication cycle that preceded the replication failure.

22 Claims, 4 Drawing Sheets

RESYNCHRONIZATION OF A REMOTE STORAGE SITE AFTER REPLICATION FAILURE

BACKGROUND

Remote replication in storage systems is used to replicate logical volumes of a primary (also called 'local') site to a secondary (also called 'remote') site. A site can be a storage system or a part of a storage system. The storage system can be a mass storage system capable of storing multiple Terabytes of information.

In asynchronous remote replication, batches of updates are periodically sent to the remote storage site. The batches of updates are performed in cycles (replication cycles).

The content transmitted to the remote storage site at each replication cycle includes differences that occurred in the logical volume to be replicated, since the previous replication cycle. The term "difference" refers to data that was changed (updated, added or deleted) since the previous replication cycle and the respective range of addresses within the logical volume, where the changed data is stored.

Each replication cycle is associated with a point in time. The content of a replication cycle can be calculated by comparing (a) a snapshot of the logical volume at a point in time that is associated with the replication cycle, to (b) a snapshot of the logical volume at a point in time that is associated with a last replication cycle that preceded the replication cycle.

However, the content of the replication cycle may be determined by using other techniques as well.

The local storage system transmits all the content of the replication cycle (the differences) to the remote storage site. Upon successful completion of the replication cycle, after the content of the replication cycle is stored in the replicated volume, a snapshot of the replicated logical volume may also be taken at the remote storage site to reflect a valid replica of the replicated volume and can be used for restoring a compatible and consistent state of the replicated volume, in case of resuming the replication after failure, when the consistency state of the current version of the replicated volume is unknown.

Generally, when the local storage site gets disconnected from the remote storage site in a middle of a replication cycle, either due to communication failure or due to a failure of either of the sites, there is a need to perform a recovery process.

During the recovery process the remote storage site should first revert to a consistent state reflected by a snapshot of a previous replication cycle and the local storage site must transmit to the remote storage site the entire content of the interrupted replication cycle—as it is not known which of the differences were received and stored by the remote storage site.

Reverting to a consistent state at the remote storage site generally involves restoring the last snapshot that was taken before the failure, so as to become the working version of the replicated volume. A restore operation requires involvement of a storage system administrator and is further a time consuming operation that suspends the process of recovery until the snapshot is restored and the remote storage site is ready to receive the recent differences.

SUMMARY

There are provided systems, methods and non-transitory computer readable media for decoding one or more component codes, as illustrated in the claims.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

According to embodiments of the present invention, upon recovering from a failure of the replication process, the remote storage site does not need to regress to a previous consistent version of the replicated volume. Instead it calculates the differences between the last consistent version of the replicated volume and the current state (working version) of the replicated volume. The current state is likely to be inconsistent with the local storage system (e.g., does not much any version that was captured in the local storage site), as it probably reflects a state of a middle of a replication cycle. Therefore the replicated volume needs to be synchronized with the local storage system, so as to match the current content of the source volume, before the replication cycles can be resumed. The differences calculated by the remote storage system reflect writes to certain volume addresses in the replicated volume that occurred since the last consistent version that was captured at the remote storage site. Since the replication was interrupted by the failure, the certain volume addresses may be unmapped (released) in the source volume or may be rewritten with new data, and therefore the data stored in the certain volume addresses of the replicated volume may be superseded. The certain volume addresses are sent to the local storage system so that the local storage system will force the current content stored in these addresses to be sent to the remote storage system, in addition to other changes.

Figure 1:
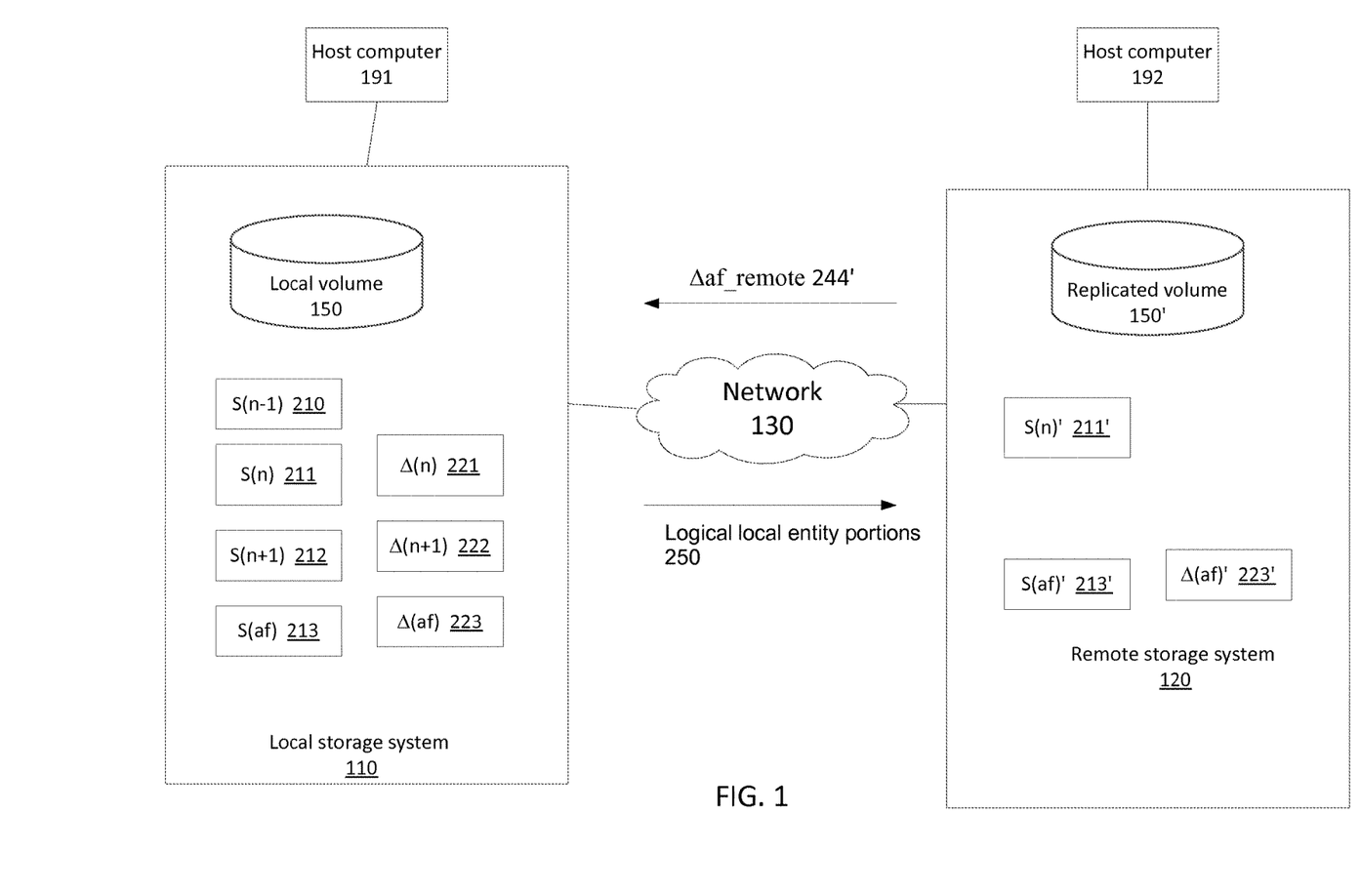
FIG. 1 illustrates a local storage site, a remote storage site and their environment according to an embodiment of the invention.

FIG. 1 illustrates a local storage system 110 and a remote storage system 120 that handle a remote replication process for one or more logical volumes according to an embodiment of the invention. FIG. 1 also shows host computers 191 and 192 coupled to local storage site 110 and remote storage site 120 respectively and shows network 130 that is coupled between local storage site 110 and remote storage site 120.

Figure 2:
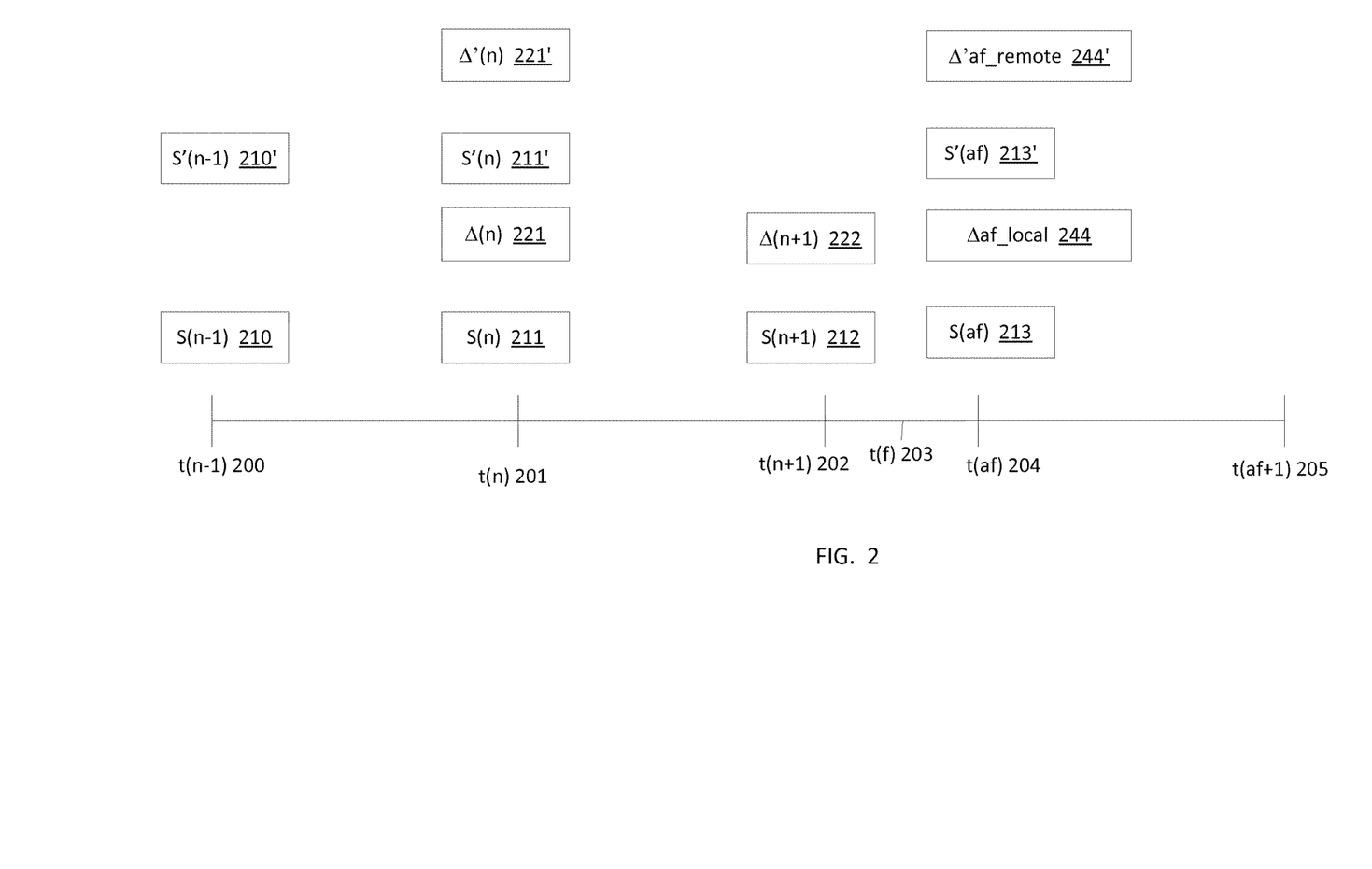
FIG. 2 is a timing diagram according to an embodiment of the invention.

FIG. 2 is a timing diagram according to an embodiment of the invention. In this example, source volume 150 of local storage system 110 is replicated to a replicated volume 150' in remote storage system 120.

For the sake of the replication process of source volume 150, local storage system 110 takes a new snapshot of source volume 150 every replication cycle and calculates the differences between the new snapshot and a snapshot that was taken in the previous cycle.

For example, at a certain replication cycle n that starts at time t(n) 201, local storage system 110 takes a local snapshot s(n) 211 of source volume 150, then calculates the differences Δn 221 between local snapshot s(n) 211 and a local snapshot s(n−1) 210 that was taken in a previous replication cycle n−1. Local storage system 110 sends the differences Δn 221 to remote storage system 120.

Remote storage system 120 writes the data associated with the differences Δn to replicated volume 150' and takes a remote snapshot s'(n) 211', which is identical to local snapshot s(n) 211, except that it is stored in the remote storage system.

For the sake of simplifying the illustration, FIG. 2 illustrates the operations of: taking snapshot s(n) 211, calculating/sending Δn 221 and taking snapshot s'(n) 211'—as all occurring at a point in time t(n) 201. It is noted that this illustration is for expressing that these operations are associated with t(n) 201, however, these operations take place during a time interval that starts at t(n) 201 and ends before t(n+1) 202.

On time t(n+1) 202, e.g., the start of replication cycle n+1, local storage system 110 takes a local snapshot s(n+1) 212 of source volume 150, calculates the differences Δ(n+1) 222 and starts sending the differences Δ(n+1) 222 to remote storage system 120.

During the transmission of the differences Δ(n+1) 222 of replication cycle n+1, the replication process is interrupted, due to e.g. a network connection failure (or due to a failure of one of the storage systems). The interruption is longer than the time it would have taken to successful retransmission of failed messages. i.e., if the communication line fails temporarily and unacknowledged messages can be retransmitted successfully, the replication would not be considered as interrupted. Therefore the following recovery process is activated only if the communication failure exceed a certain time period. In FIG. 2 this replication failure occurs at t(f) 203.

When the connection is restored, a recovery process starts. The recovery process of the present invention, eliminates the need to restore the recent consistent snapshot, i.e., remote snapshot s'(n), onto the working version of replicated volume 150'.

Instead, remote storage system 120 calculates (at after final point in time t(af) 204) the differences between the current content of replicated volume 150' and remote snapshot s'(n) 211' and obtains at least the addresses within replicated volume 150' that are associated with the differences. At least the addresses of these differences are sent to local storage system 110. These differences (or the addresses of the differences) will be referred to hereinafter as after-failure remote differences (Δaf_remote) 244'.

In parallel to the actions taken by the remote storage system (or after the after-failure remote differences are received at the local system), the local storage system takes an after failure local snapshot s(af) 213 that represents the current state of the local volume 150.

The local storage system then calculates after-failure local differences Δaf_local 244, between snapshot s(af) 213 and the previous consistent snapshot that also exists as a remote snapshot in the remote storage system, i.e., snapshot s(n) 211. These after-final local differences represent the state of the local volume 150 at point in time t(af) 204.

The local storage system can disregard and even delete snapshot s(n+1) 212 which exists only at the local storage system. This snapshot does not reflect the current state of the local volume nor was it matured into a consistent snapshot in the remote storage site.

The local storage system prepares an after failure replication cycle that includes the after-failure local differences Δaf_local 244 and adds to differences Δaf_local 244 the data stored in the source volume in the addresses included in the after-failure remote differences Δaf_remote 244'. The after failure replication cycle includes sending logical local entity portions (denoted 250 in FIG. 1) listed in either one of Δaf_local 244 and Δaf_remote 244'.

The following is an example for a case where the after-failure local differences do not include an address that is included in the after-failure remote differences. Suppose in snapshot s(n) 211 a certain address range was written with a certain common pattern. A common pattern refers to a sequence of characters that is commonly written to the volume. An example of such common pattern is a sequence of zeros that is written upon un-mapping address ranges (for releasing storage space). Un-mapping is quite a frequent operation and therefore writing zeros to the volume (or marking otherwise that this part of the volume is unmapped) is very common. Suppose now that since snapshot s(n) was taken, the certain address range was written with new data overwriting the common pattern that existed in snapshot s(n) and this data was transmitted and written also to the replicated volume at the remote storage site before the failure. Since the failure occurred and until the recovery started, the certain address range was rewritten once again with the common pattern, at the local storage site only.

When the after-failure local differences Δaf_local 244 are calculated, it will be determined that the certain address range includes the common pattern in both snapshot s(n) 211 and snapshot s(af) 213 and therefore the certain address range will not be considered as changed and will not be included in the after-failure local differences. However, since the remote storage site will report the certain address range as part of the after-failure remote differences, this problem will be fixed since the local system will add to the transmitted differences, the current local content of all addresses included in the reported the after-failure remote differences.

Figure 3:
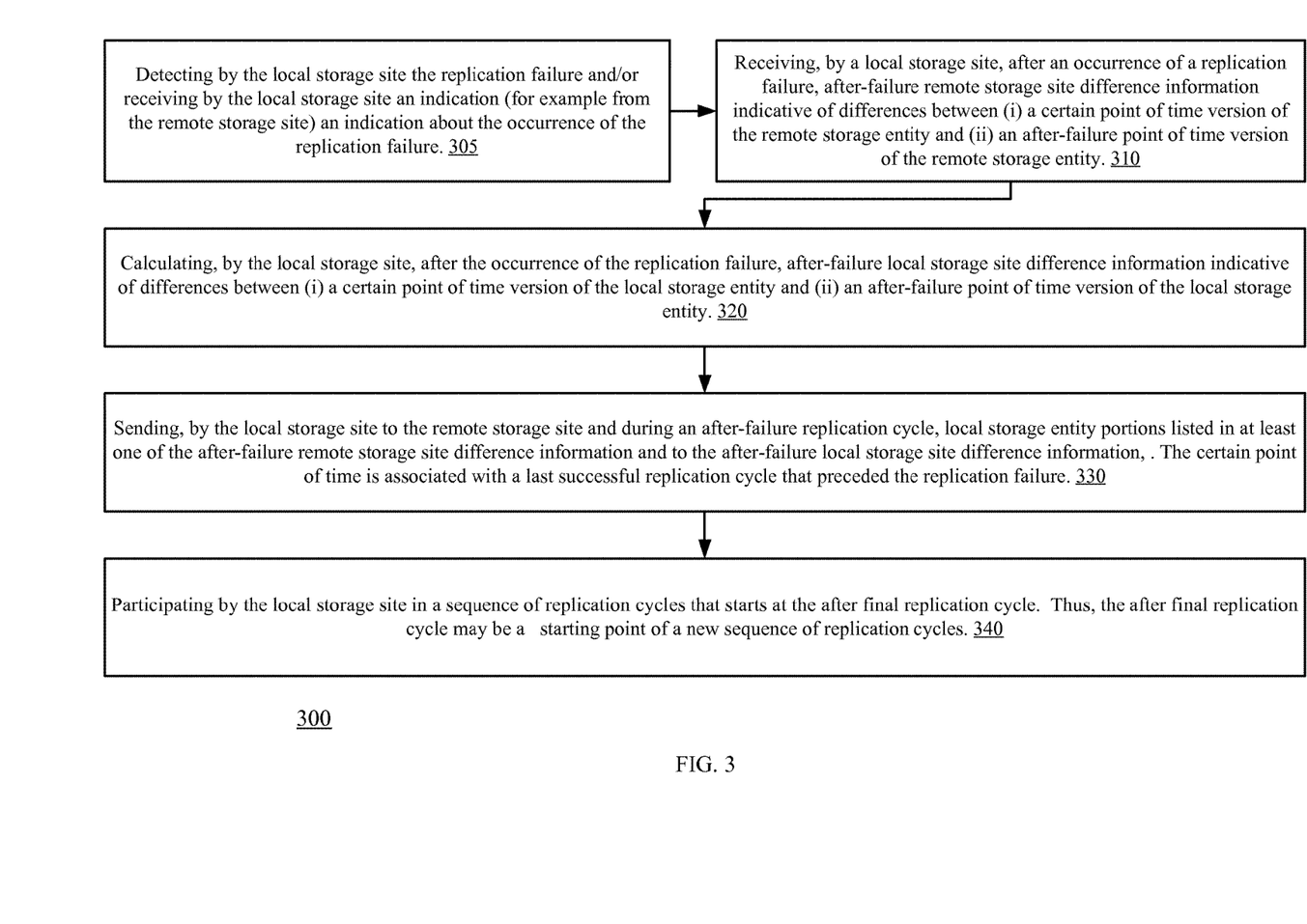
FIG. 3 illustrates a method according to an embodiment of the invention.

FIG. 3 illustrates method 300 according to an embodiment of the invention.

Method 300 is for replicating a local storage entity to provide a remote storage entity.

Each one of the local storage entity and the remote storage entity may be a logical volume, a group of logical volumes, part of a logical volume, a storage device, a group of storage devices, a partition within a storage device, and the like. A local storage entity is associated with the local storage system. A remote storage entity is associated with the remote storage system.

Method 300 may start by step 305 and/or 310.

Step 305 may include detecting by the local storage site the replication failure and/or receiving by the local storage site an indication (for example from the remote storage site) an indication about the occurrence of the replication failure.

Step 305 may be followed by step 310, which is executed upon recovering from the replication failure. Alternatively, the reception of the after-final remote storage site differences information (described in step 310) may be the indicator that informs the local storage system about the replication failure.

Step 310 may include receiving, by the local storage site, after an occurrence of a replication failure (and upon performing recovery from the failure), after-failure remote storage site difference information indicative of differences between (i) a certain point in time version of the remote storage entity and (ii) an after-failure point in time version of the remote storage entity. The certain point in time version of the remote storage entity is a version that reflects a successful completion of a previous replication cycle, preferably, the most recent replication cycle prior to the failure. The certain point in time version of the remote storage entity may be reflected by a snapshot that was taken at the remote site after a successful completion of a recent replication cycle prior to the failure, for example, remote snapshot s'(n) 211'. The certain point in time preceded the after-failure point in time and may be, for example, t(n) 201.

Step 310 may be followed by step 320 of calculating, by the local storage site, after the occurrence of the replication failure, after-failure local storage site difference information indicative of differences between (i) a certain point in time version of the local storage entity and (ii) an after-failure point in time version of the local storage entity. The certain point in time version of the local storage entity corresponds to the certain point in time version of the remote storage entity, as both versions reflects a successful completion of a certain replication cycle associated with the certain point in time. The certain point in time version of the local storage entity may be reflected by local snapshot s(n) 211 that corresponds to remote snapshot s'(n) 211'.

Step 320 may include calculating differences between a certain point in time snapshot of the local storage entity and the after-failure point in time version of the local storage entity, which may also be captured by an after-failure point in time snapshot, e.g., s'(af) 213'.

The after-failure remote storage site difference information may consist essentially of addresses within the remote storage entity whose content was changed between the certain point in time and the after-failure point in time.

The after-failure remote storage site difference information may include addresses within the remote storage entity whose content was changed between the certain point in time and the after-failure point in time.

Step 320 may be followed by step 330 of sending, by the local storage site to the remote storage site and during an after-failure replication cycle local storage entity portions listed in at least one of the after-failure remote storage site difference information and the after-failure local storage site difference information. The certain point in time is associated with a last successful replication cycle that preceded the replication failure. Step 330 may include reading, from the after-failure point in time version of the local storage entity, data of the local storage entity portions.

The local storage entity portions sent during step 330 may include at least data and address ranges of all local storage entity portions that are listed in either one of the after-failure remote storage site difference information and the after-failure local storage site difference information. Accordingly, a logical OR operation can be made on all addresses (or other identifiers) of the storage entity portion that are listed in the after-failure remote storage site difference information and on all addresses (or other identifiers) of the storage entity portion that are listed in the after-failure local storage site difference information to provide an aggregate list (or other data structure) of storage entity portions. In case where a certain address appears in both local and remote difference information, but one appearance is indicative of a wider address range than the other, the aggregate list will include a local storage entity portion that covers the wider address range.

Step 330 may be followed by step 340 of participating by the local storage site in a sequence of replication cycles that starts at the after final replication cycle. Thus, the after final replication cycle may be a starting point of a new sequence of replication cycles. In FIG. 2 the first replication cycle after the execution of step 330 occurs at point in time t(af+1) 205.

Figure 4:
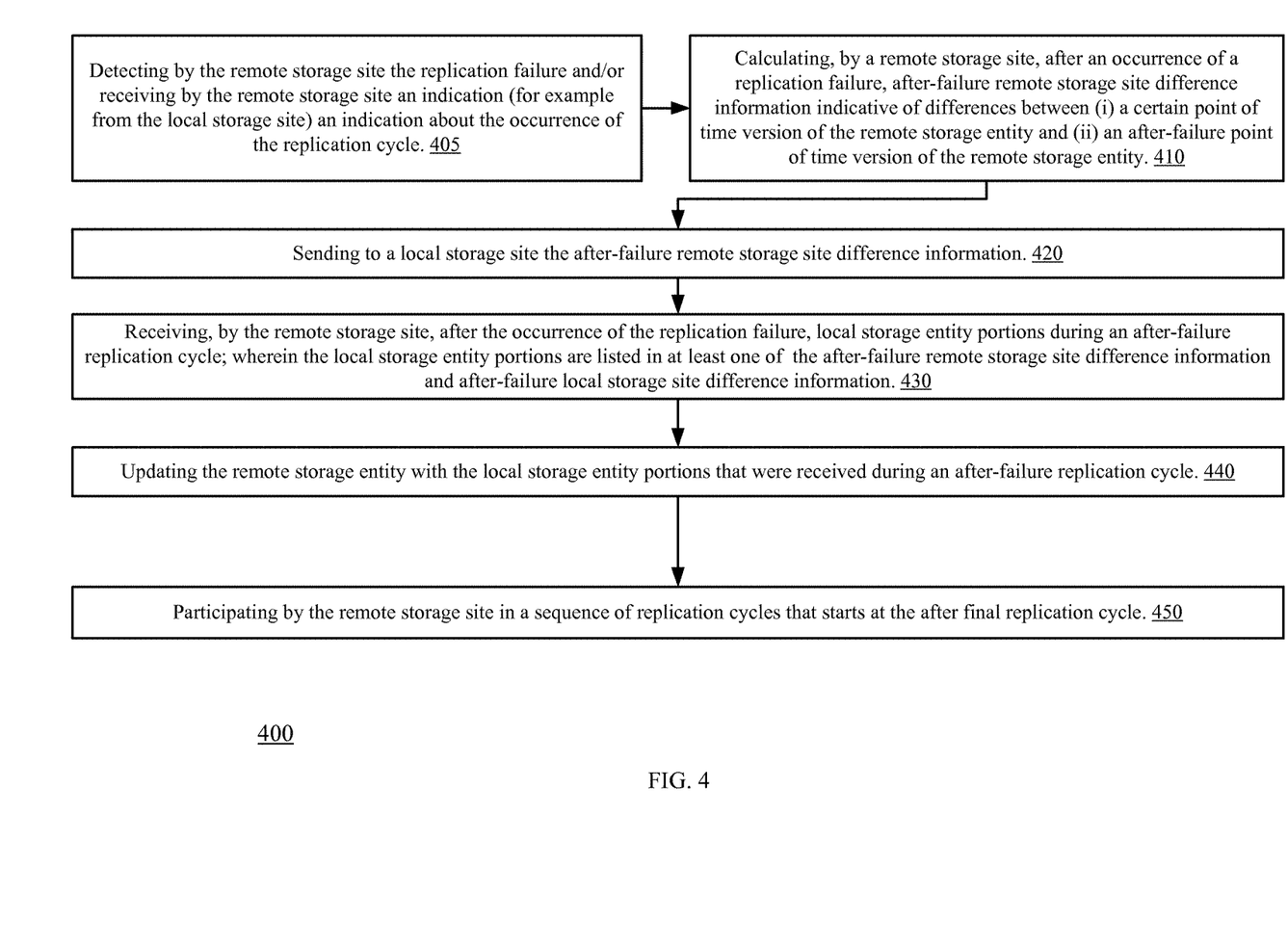
FIG. 4 illustrates a method according to an embodiment of the invention.

FIG. 4 illustrates method 400 according to an embodiment of the invention. Method 400 is for replicating a local storage entity to provide a remote storage entity.

Method 400 may start by step 405 of detecting by the remote storage site the replication failure and/or receiving by the remote storage site an indication (for example from the local storage site) an indication about the occurrence of the replication failure. The following steps are performed upon recovering from the replication failure.

Step 405 may be followed by step 410 of calculating, by a remote storage site, after an occurrence of a replication failure, after-failure remote storage site difference information indicative of differences between (i) a certain point in time version of the remote storage entity and (ii) an after-failure point in time version of the remote storage entity. The certain point in time version of the remote storage entity is a version that reflects a successful completion of a previous replication cycle, preferably, the most recent replication cycle prior to the failure. The certain point in time version of the remote storage entity may be reflected by a snapshot that was taken at the remote site after a successful completion of a recent replication cycle prior to the failure, for example, remote snapshot s'(n) 211' and the certain point in time is t(n) 201.

Step 410 may include calculating differences between a certain point in time snapshot of the remote storage entity and the after-failure point in time version of the remote storage entity, which may also be captured by an after-failure point in time snapshot.

Step 410 may be followed by step 420 of sending to a local storage site the after-failure remote storage site difference information.

Step 420 may be followed by step 430 of receiving, by the remote storage site, after the occurrence of the replication failure and during an after-failure replication cycle, local storage entity portions that are listed in at least one of the after-failure remote storage site difference information and after-failure local storage site difference information.

The storage entity portions sent during step 420 may include at least data and address ranges of all local storage entity portions that are listed in either one of the after-failure remote storage site difference information and the after-failure local storage site difference information. The data of the storage entity portions is read from after-failure point in time version of the local storage entity.

Step 440 may be followed by step 440 of updating the remote storage entity with the local storage entity portions that were received during an after-failure replication cycle.

The after-failure local storage site difference information is indicative of differences between (i) a certain point in time version of the local storage entity and (ii) an after-failure point in time version of the local storage entity. The certain point in time is associated with a last successful replication cycle that preceded the replication failure.

Step 440 may be followed by step 450 of participating by the remote storage site in a sequence of replication cycles that starts at the after final replication cycle.

Any combination of methods 300 and 400 may be provided. For example step 420 may be followed by step 310 and step 330 may be followed by step 430.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for replicating a local storage entity to provide a remote storage entity, the method comprises:
    receiving, by a local storage site, after an occurrence of a replication failure, after-failure remote storage site difference information indicative of differences between (i) a certain point in time version of the remote storage entity and (ii) an after-failure point in time version of the remote storage entity;
    calculating, by the local storage site, after the occurrence of the replication failure, after-failure local storage site difference information indicative of differences between (i) a certain point in time version of the local storage entity and (ii) an after-failure point in time version of the local storage entity; and
    sending, by the local storage site to the remote storage site, local storage entity portions that are stored in the local storage entity and correspond to addresses listed in the after-failure remote storage site difference information and the after-failure local storage site difference information, during an after-failure replication cycle;
    wherein at least one of the local storage entity portions corresponds to an address that is listed in the after-failure remote storage site difference information and is not listed in the after-failure local storage site difference information;
    wherein the sending of the local storage entity portions is for updating the remote storage entity with the local storage entity portions;
    and
    wherein the certain point in time is associated with a last successful replication cycle that preceded the replication failure.

2. The method according to claim 1 wherein the local storage entity portions sent during the after-failure replication cycle comprise all local storage entity portions that are listed in either one of the after-failure remote storage site difference information and the after-failure local storage site difference information.

3. The method according to claim 1 further comprising participating by the local storage site in a sequence of replication cycles that starts at the after final replication cycle.

4. The method according to claim 1 wherein the calculating of the after-failure local storage site difference information comprises calculating differences between a certain point in time snapshot of the local storage entity and the after-failure point in time version of the local storage entity.

5. The method according to claim 1 wherein the after-failure remote storage site difference information consists essentially of addresses within the remote storage entity whose content was changed between the certain point in time and the after-failure point in time.

6. The method according to claim 1 wherein the after-failure remote storage site difference information comprises addresses within the remote storage entity whose content was changed between the certain point in time and the after-failure point in time.

7. The method according to claim 1 further comprising calculating, by the remote storage site, after the occurrence of the replication failure, the after-failure remote storage site difference information.

8. A method for replicating a local storage entity to provide a remote storage entity, the method comprises:
    calculating, by a remote storage site, after an occurrence of a replication failure, after-failure remote storage site difference information indicative of differences between (i) a certain point in time version of the remote storage entity and (ii) an after-failure point in time version of the remote storage entity;
    sending to a local storage site the after-failure remote storage site difference information;
    receiving, by the remote storage site, after the occurrence of the replication failure, local storage entity portions during an after-failure replication cycle; wherein the local storage entity portions include content stored in the local storage entity and correspond to addresses that are listed in the after-failure remote storage site difference information and after-failure local storage site difference information; wherein at least one of the local storage entity portions corresponds to an address that is listed in the after-failure remote storage site difference information and is not listed in the after-failure local storage site difference information; and updating the remote storage entity with the local storage entity portions that were received during an after-failure replication cycle;

wherein the after-failure local storage site difference information is indicative of differences between (i) a certain point in time version of the local storage entity and (ii) an after-failure point in time version of the local storage entity; and wherein the certain point in time is associated with a last successful replication cycle that preceded the replication failure.

9. The method according to claim 8 wherein the storage entity portions sent during the after-failure replication cycle comprises all local storage entity portions that are listed in either one of the after-failure remote storage site difference information and the after-failure local storage site difference information.

10. The method according to claim 8 wherein the calculating of the after-failure remote storage site difference information comprises calculating differences between a certain point in time snapshot of the remote storage entity and the after-failure point in time version of the remote storage entity.

11. The method according to claim 8 further comprising participating by the remote storage site in a sequence of replication cycles that starts at the after final replication cycle.

12. A non-transitory computer readable medium that stores instructions that once executed by a local storage site cause the local storage site to:

receive after an occurrence of a replication failure, after-failure remote storage site difference information indicative of differences between (i) a certain point in time version of a remote storage entity and (ii) an after-failure point in time version of the remote storage entity;

calculate after the occurrence of the replication failure, after-failure local storage site difference information indicative of differences between (i) a certain point in time version of a local storage entity and (ii) an after-failure point in time version of the local storage entity; and send to the remote storage site, local storage entity portions that are stored in the local storage entity and correspond to addresses listed in the after-failure remote storage site difference information and the after-failure local storage site difference information, during an after-failure replication cycle;

wherein at least one of the local storage entity portions corresponds to an address that is listed in the after-failure remote storage site difference information and is not listed in the after-failure local storage site difference information;

wherein the local storage entity portions are sent so as to update the remote storage entity with the local storage entity portions; and wherein the certain point in time is associated with a last successful replication cycle that preceded the replication failure.

13. The non-transitory computer readable medium according to claim 12 wherein the local storage entity portions sent during the after-failure replication cycle comprise all local storage entity portions that are listed in either one of the after-failure remote storage site difference information and the after-failure local storage site difference information.

14. The non-transitory computer readable medium according to claim 12 that stores instructions that once executed by a local storage site cause the local storage site to participate in a sequence of replication cycles that starts at the after final replication cycle.

15. The non-transitory computer readable medium according to claim 12 wherein the calculating of the after-failure local storage site difference information comprises calculating differences between a certain point in time snapshot of the local storage entity and the after-failure point in time version of the local storage entity.

16. The non-transitory computer readable medium according to claim 12 wherein the after-failure remote storage site difference information consists essentially of addresses within the remote storage entity whose content was changed between the certain point in time and the after-failure point in time.

17. The non-transitory computer readable medium according to claim 12 wherein the after-failure remote storage site difference information comprises addresses within the remote storage entity whose content was changed between the certain point in time and the after-failure point in time.

18. The non-transitory computer readable medium according to claim 12 that stores instructions that once executed by a local storage site cause the local storage site to calculate, after the occurrence of the replication failure, the after-failure remote storage site difference information.

19. A non-transitory computer readable medium that stores instructions that once executed by a remote storage site cause the remote storage site to:

calculate, after an occurrence of a replication failure, after-failure remote storage site difference information indicative of differences between (i) a certain point in time version of a remote storage entity and (ii) an after-failure point in time version of the remote storage entity;

sending to a local storage site the after-failure remote storage site difference information;

receive after the occurrence of the replication failure, local storage entity portions during an after-failure replication cycle; wherein the local storage entity portions include content stored in the local storage entity and correspond to addresses that are listed in the after-failure remote storage site difference information and after-failure local storage site difference information; and update the remote storage entity with the local storage entity portions that were received during an after-failure replication cycle;

wherein the after-failure local storage site difference information is indicative of differences between (i) a certain point in time version of a local storage entity and (ii) an after-failure point in time version of the local storage entity;

wherein at least one of the local storage entity portions corresponds to an address that is listed in the after-failure remote storage site difference information and is not listed in the after-failure local storage site difference information; and wherein the certain point in time is associated with a last successful replication cycle that preceded the replication failure.

20. The non-transitory computer readable medium according to claim 19 wherein the storage entity portions sent during the after-failure replication cycle comprises all local storage entity portions that are listed in either one of the after-failure remote storage site difference information and the after-failure local storage site difference information.

21. The non-transitory computer readable medium according to claim 19 wherein the calculating of the after-failure remote storage site difference information comprises calculating differences between a certain point in time snapshot of the remote storage entity and the after-failure point in time version of the remote storage entity.

22. The non-transitory computer readable medium according to claim 19 that stores instructions that once executed by a local storage site cause the local storage site to participate in a sequence of replication cycles that starts at the after final replication cycle.

* * * * *